(12) United States Patent
Castellucci et al.

(10) Patent No.: US 10,432,558 B2
(45) Date of Patent: Oct. 1, 2019

(54) SYNCHRONOUS CONFERENCING WITH AGGREGATION OF MESSAGES

(71) Applicant: INTERNATIONAL BUSINESS MACHINES CORPORATION, Armonk, NY (US)

(72) Inventors: Antonio Castellucci, Rome (IT); Gerardo Marsiglia, Rome (IT)

(73) Assignee: International Business Machines Corporation, Armonk, NY (US)

( * ) Notice: Subject to any disclaimer, the term of this patent is extended or adjusted under 35 U.S.C. 154(b) by 792 days.

(21) Appl. No.: 14/148,926

(22) Filed: Jan. 7, 2014

(65) Prior Publication Data
US 2014/0207883 A1 Jul. 24, 2014

(30) Foreign Application Priority Data
Jan. 22, 2013 (GB) .................................. 1301068.1

(51) Int. Cl.
*H04L 12/58* (2006.01)

(52) U.S. Cl.
CPC .............. *H04L 51/04* (2013.01); *H04L 51/16* (2013.01)

(58) Field of Classification Search
CPC ....... H04L 51/04; H04L 67/325; H04L 12/58; Y02D 70/142; H04W 52/0261; H04W 52/146; H04W 72/1242; H04W 71/12; H04W 52/0251
See application file for complete search history.

(56) References Cited

U.S. PATENT DOCUMENTS

| | | | |
|---|---|---|---|
| 8,180,840 B2 | 5/2012 | Malik | |
| 8,234,342 B2 | 7/2012 | Izumi | |
| 8,244,810 B1 | 8/2012 | Haldar | |
| 2006/0026252 A1* | 2/2006 | Caspi | G06Q 10/107 709/207 |
| 2007/0186172 A1* | 8/2007 | Sego | H04L 12/1831 715/753 |
| 2008/0046532 A1 | 2/2008 | Caspi et al. | |
| 2010/0017483 A1* | 1/2010 | Estrada | G06Q 10/107 709/206 |

(Continued)

FOREIGN PATENT DOCUMENTS

| CN | 101815034 B | | 7/2012 |
|---|---|---|---|
| CN | 103076950 A | * | 5/2013 |

(Continued)

OTHER PUBLICATIONS

Anonymous, "A Method or System for Controlling the Send Rate of Messages by a Chat Partner", IP.com, IPCOM000209067D, Jul. 25, 2011, pp. 1-9.

(Continued)

*Primary Examiner* — Sargon N Nano
(74) *Attorney, Agent, or Firm* — Law Office of Jim Boice

(57) ABSTRACT

A method, system, and/or computer program product operates a synchronous conference on a computing system. A processor provides at least one sequence of original messages to be sent from a sender user to a corresponding at least one receiver user. The original messages of each sequence are aggregated into corresponding aggregated messages according to a time distance between each pair of consecutive original messages of the sequence. The aggregated messages are then sent to the corresponding receiver user.

10 Claims, 7 Drawing Sheets

(56) References Cited

U.S. PATENT DOCUMENTS

| | | | |
|---|---|---|---|
| 2010/0082754 A1* | 4/2010 | Bryan | G06Q 10/10 709/206 |
| 2011/0029898 A1* | 2/2011 | Malik | G06Q 10/107 715/758 |
| 2013/0097260 A1* | 4/2013 | Lee | H04W 4/00 709/206 |
| 2014/0051485 A1* | 2/2014 | Wang | H04W 4/70 455/574 |
| 2014/0059448 A1* | 2/2014 | Lee | H04L 51/00 715/752 |
| 2014/0143202 A1* | 5/2014 | Rekula | G06F 17/30 707/610 |
| 2014/0316844 A1* | 10/2014 | Rosenberg | G06Q 10/0633 705/7.27 |
| 2016/0081029 A1* | 3/2016 | Wang | H04W 4/70 455/574 |
| 2016/0246695 A1* | 8/2016 | Heikinheimo | G06F 11/261 |
| 2019/0066021 A1* | 2/2019 | Tang | G06Q 10/06393 |

FOREIGN PATENT DOCUMENTS

| | | | |
|---|---|---|---|
| EP | 1881658 A1 | 1/2008 | |
| WO | 2012121784 A2 | 9/2012 | |
| WO | WO-2012121784 A2 * | 9/2012 | H04W 4/70 |

OTHER PUBLICATIONS

IBM, "Eliminating Reference Ambiguity in Instant Message Replies", IP.com, IPCOM000145903D, Jan. 31, 2007, pp. 1-4.

* cited by examiner

SYNCHRONOUS CONFERENCING WITH AGGREGATION OF MESSAGES

This application is based on and claims the benefit of priority from United Kingdom (GB) Patent Application 1301068.1, filed on Jan. 22, 2013, and herein incorporated by reference in its entirety.

BACKGROUND

The solution according to one or more embodiments of the present invention relates to the computing field. More specifically, this solution relates to synchronous conferencing.

Synchronous conferencing is the formal term used in computer science to denote the exchange of messages in real-time among users of computing machines (commonly referred to as online chat). A typical example of synchronous conferencing is an instant messaging service, wherein the messages (also referred to as instant messages) are text-based messages, which are exchanged among client computing machines of the users connected over the Internet to a server computing machine offering the instant messaging service.

In synchronous conferencing the exchange of the messages is perceived by the users as immediate, with each question submitted by a user that is synthetically answered at once; this provides the impression of an actual conversation happening face-to-face among the users (irrespectively of their physical distance). In this way, the users may exchange information in a direct and immediate way. Synchronous conferencing has become very popular in recent years, particularly thanks to the ubiquitous availability of the Internet (especially on mobile devices, such as smartphones).

However, the simplicity of use of the synchronous conferencing may cause a proliferation of the messages. For example, very often a user (sender) sends many messages in short sequence while the formulation of a question or a response to previous messages is in progress.

The corresponding high number of messages that are received by each other user (receiver) may be quite annoying. Indeed, the receiver has to follow the sequence of the messages to understand the corresponding concept correctly. This involves a consumption of attention time of the receiver, which is then distracted from his/her work in progress.

This problem is exacerbated when the receiver receives messages from different senders that are interleaved among them. Indeed, in this case it is far more difficult to extract the meaning of the different concepts that are conveyed by each sender.

All of the above may cause misunderstandings or requests of clarifications and corresponding explanations, which further increase the number of exchanged messages with a chain reaction amplifying the drawbacks pointed out above.

These drawbacks are particular acute in business applications; for example, this strongly degrades the performance of any collaboration system that is based on synchronous conferencing.

Moreover, the high number of exchanged messages involves a remarkable increment of traffic in a network over which the messages are sent, and an increase of the workload of the computing machines implementing the corresponding services (and especially the server computing machines). This degrades the performance of the synchronous conferencing; moreover, this may bring about a congestion of the entire network (with negative side-effects on any other computing machines connected thereto).

One prior art technique for reducing the exchange of erroneous messages proposes delaying the sending of each message individually for a pre-defined period of time (for example, 1-10 s). This gives the sender extra-time to verify the message; when the sender detects an error, the sending of the message is prevented, so as to allow him/her to correct the message and then to send its corrected version.

However, this technique only avoids the sending of erroneous messages; however, it has not effect on the number of exchanged messages (and then on the above-mentioned drawbacks caused by it).

SUMMARY

A method, system, and/or computer program product operates a synchronous conference on a computing system. A processor provides at least one sequence of original messages to be sent from a sender user to a corresponding at least one receiver user. The original messages of each sequence are aggregated into corresponding aggregated messages according to a time distance between each pair of consecutive original messages of the sequence. The aggregated messages are then sent to the corresponding receiver user.

BRIEF DESCRIPTION OF THE SEVERAL VIEWS OF THE DRAWINGS

The solution according to one or more embodiments of the invention, as well as further features and the advantages thereof, will be best understood with reference to the following detailed description, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
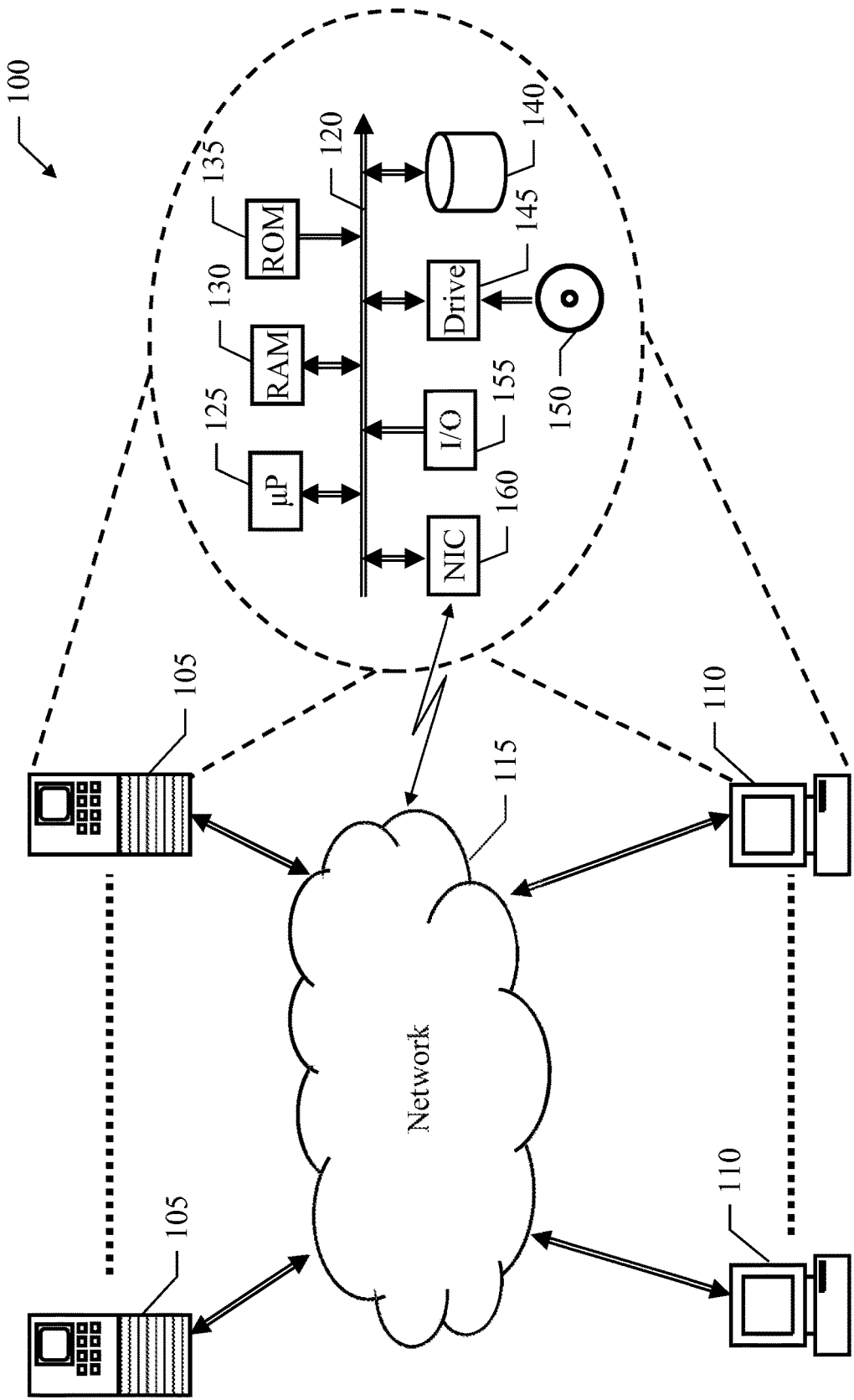
FIG. 1 shows a pictorial representation of a computing infrastructure wherein the solution according to an embodiment of the invention may be practiced.

With reference in particular to the FIG. 1, a pictorial representation is shown of a computing infrastructure 100 wherein the solution according to an embodiment of the invention may be practiced.

The computing infrastructure 100 is based on a client/server model, wherein one or more server computing machines (or simply servers) 105 provide services to a plurality of client computing machines (or simply clients) 110. Typically, the computing infrastructure 100 has a distributed architecture with the servers 105 and the clients 110 that communicate among them over a network 115 (for example, Internet based). In the specific case at issue, some of the servers 105 provide a synchronous conferencing service, for example, an instant-messaging (or simply messaging) service, which allows users of the clients 110 to exchange messages in real-time.

Each client 110 (for example, a PC) comprises several units that are connected in parallel to bus sub-system 120. In detail, one or more microprocessors (μP) 125 control operation of the client 110; a RAM 130 is used as a working memory by the microprocessors 125, and a ROM 135 stores basic code for a bootstrap of the client 110. Several peripheral units are further connected to the bus sub-system 120 (by means of respective interfaces). Particularly, a mass memory comprises one or more hard disks 140 and drives 145 for reading/writing optical disks 150 (for example, CDs or DVDs). Moreover, the client 110 comprises input/output units 155 (for example, a keyboard, a mouse and a monitor). A network adapter (Network Interface Card, or NIC) 160 is used to connect the client 110 to the network 115.

Figure 2:
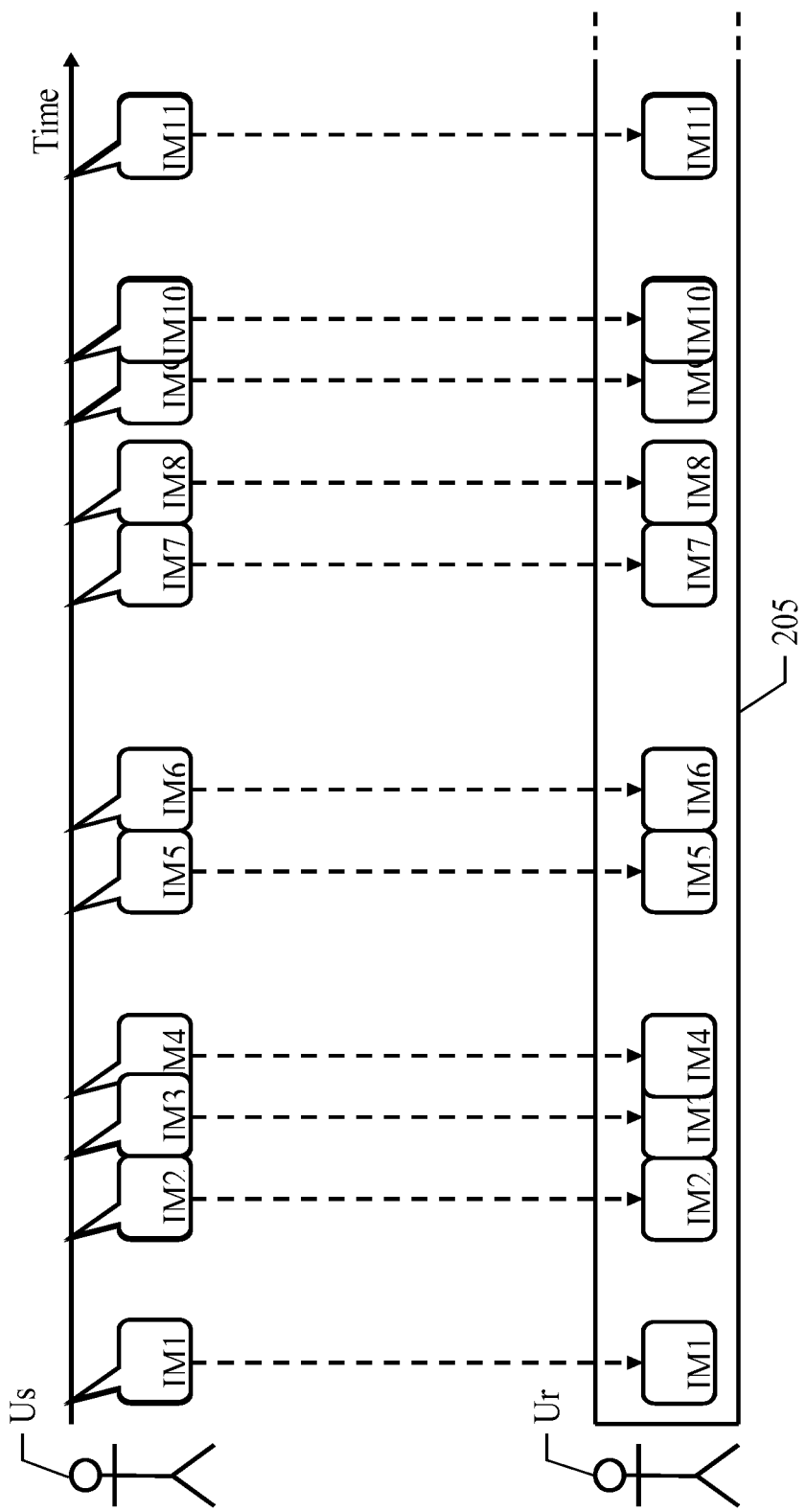
FIG. 2 shows an exemplary single-thread session of an instant-messaging application known in the art.

An exemplary single-thread session of an instant-messaging application known in the art is shown in the FIG. 2.

In a session (or chat channel) of the single thread type, two users (connected on their clients to the same server providing the messaging service) continually exchange messages in real-time. For example, one of the users acting at the moment as a sender user (or simply sender) Us may send a sequence of messages IM1-IM11 over time to another one of the users now acting as a receiver user (or simply receiver) Ur. The messages IM1-IM11 are sent to the receiver Ur as soon as they are submitted by the sender Us, and they are received by him/her soon after that (as far as permitted by technical constraints). The messages IM1-IM11 are displayed in succession within a dedicated window 205 of the client of the receiver Ur (as soon as they are received), so as to represent a corresponding conversation (or thread). In this way, the exchange of the messages between the users Us,Ur is perceived as immediate (i.e., with no substantial delay), so as to provide the impression of an actual conversation face-to-face happening in real-time.

Figure 3:
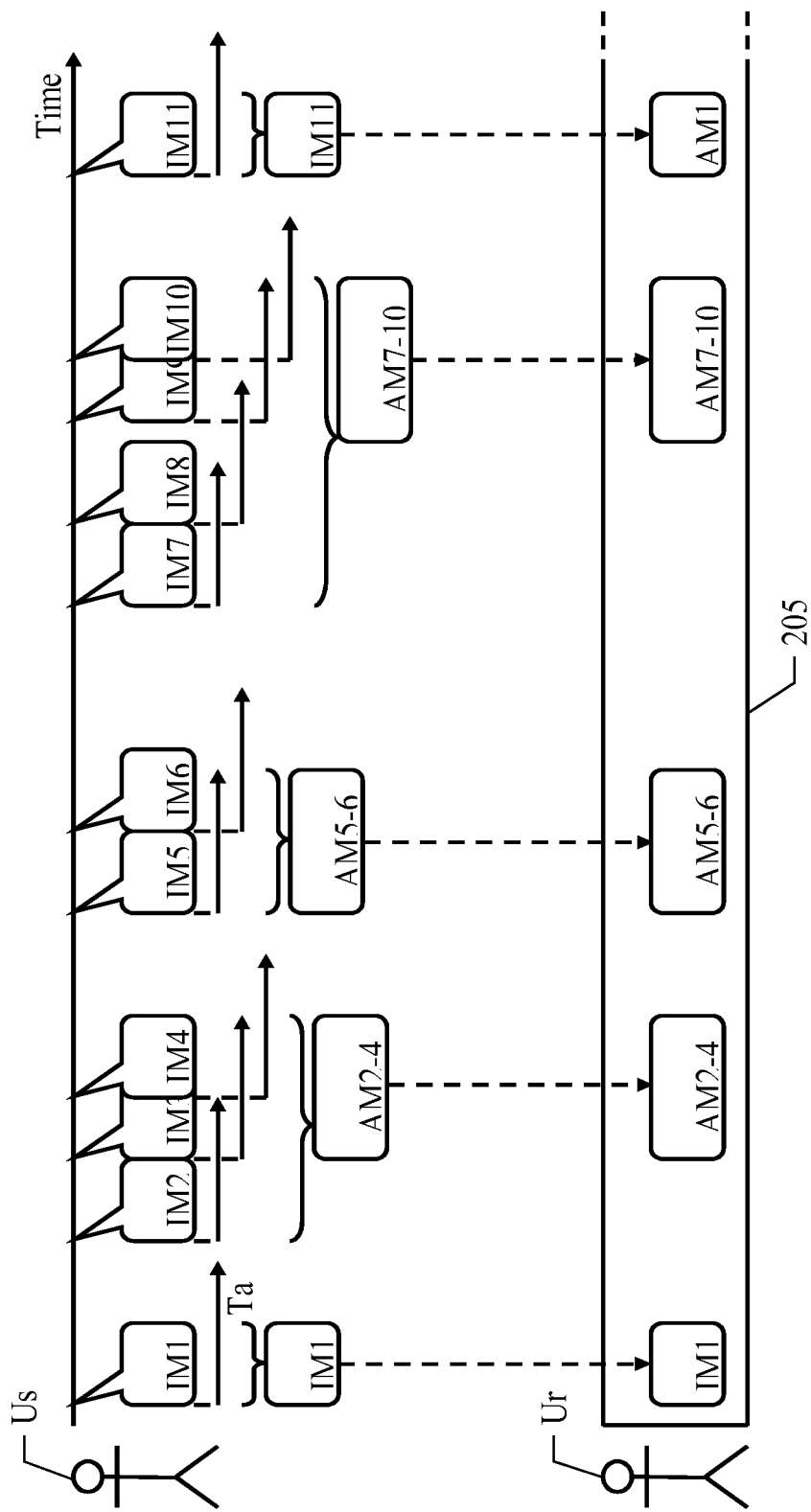
FIG. 3 shows an exemplary single-thread session of an instant-messaging application according to an embodiment of the invention.

An exemplary single-thread session of an instant-messaging application according to an embodiment of the invention is instead shown in the FIG. 3.

In this case, the messages originally submitted by the sender Us (hereinafter referred to as original messages) are aggregated into aggregated messages according to a time distance between each pair of consecutive original messages; particularly, two or more original messages are aggregated into a single aggregated message when they are close in time (for example, when their time distance is shorter than an aggregation time Ta). For example, considering the same original messages IM1-IM11 as above, the original message IM1 remains alone (in an aggregated message AM1 only comprising it), the original messages IM2-IM4 are aggregated into an aggregated message AM2-4, the original messages IM5-IM6 are aggregated into an aggregated message AM5-6, the original messages IM7-IM10 are aggregated into an aggregated message AM7-10, and the original message IM11 remains alone (in an aggregated message AM11 only comprising it).

The aggregated messages AM1-AM11 are now sent to the receiver Ur as soon as they are completed (for example, when no further original message is submitted within the aggregation time Ta). As above, the aggregated messages AM1-AM11 are received by the receiver Ur soon after that, and they are displayed in succession within the same window 205.

The above described solution aggregates the original messages that are close in time, and then are likely to relate to a common concept; in other words, this removes the thinking time that is often used among different original messages to formulate a question or a response to previous messages.

The number of messages that are received by the receiver is then reduced accordingly. This strongly facilitates the task of following the sequence of the messages to correctly understand them. As a consequence, less attention time is consumed by the receiver, who is then less distracted from his/her work in progress.

All of the above limits the misunderstandings and the requests of clarifications and corresponding explanations, with a further reduction of the number of exchanged messages.

The above-mentioned advantages are particularly perceived in business applications; for example, this strongly increases the performance of any collaboration system that is based on synchronous conferencing.

In this case, the original messages IM1-IM11 are no longer sent to the receiver Ur as soon as they are submitted by the sender Us. Indeed, each original message IM1-IM11 is now sent in the corresponding aggregated message AM1-AM11, and then not until the latter has been completed; for example, in the above-described scenario a delay with which each original message is sent to the receiver Ur (in the corresponding aggregated message) is equal to the sum of the time distances between each pair of original messages of the aggregated message plus the aggregation time Ta (i.e., at least equal to the aggregation time Ta even when the original message is sent alone in the aggregated message). However, this delay does not adversely affect the quality of the conversation substantially (and in any case it is largely compensated for by the above-mentioned advantages).

Figure 4:
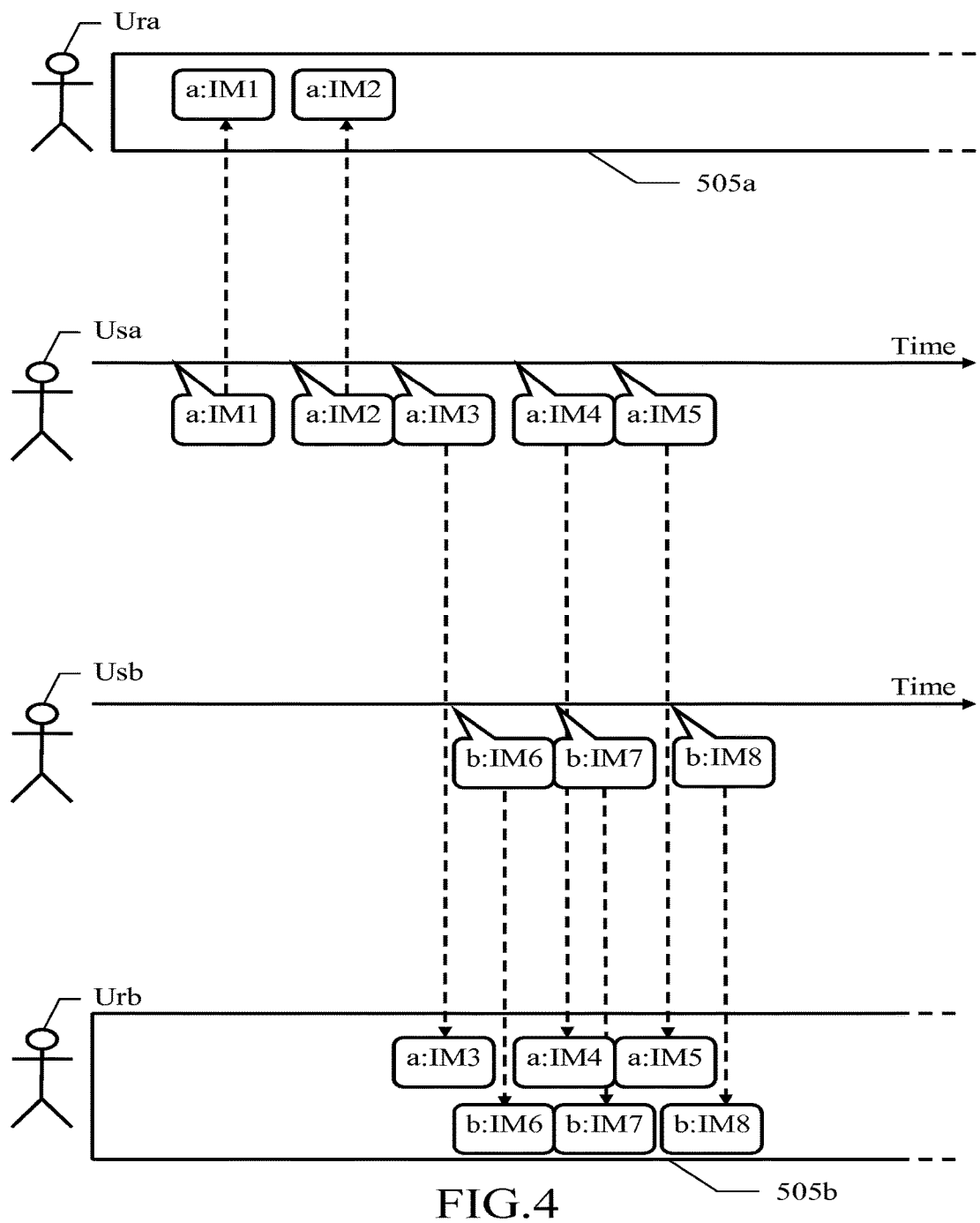
FIG. 4 shows an exemplary multi-thread session of an instant-messaging application known in the art.

An exemplary multi-thread session of an instant-messaging application known in the art is shown in the FIG. 4.

In this case, multiple users exchange messages independently over time (generally interleaved among them). For example, a sender Usa may send a sequence of messages a:IM1-a:IM2 to a receiver Ura, and another sequence of messages a:IM3-a:IM5 to another receiver Urb (with the messages a:IM1-a:IM5 that are sent to the corresponding receiver Ura,Urb as soon as they are submitted by the sender Usa). The messages a:IM1-a:IM2 are displayed in succession within a dedicated window 505a of the client of the receiver Ura, and the messages a:IM3-a:IM5 are displayed in succession within another dedicated window 505b of the client of the receiver Urb (as soon as they are received). Meanwhile, another sender Usb may send another sequence of messages b:IM6-b:IM8 to the same receiver Urb (with the messages b:IM6-b:IM8 that are again sent to the receiver Urb as soon as they are submitted by the sender Usb). The messages b:IM6-b:IM8 as well are displayed in succession within the window 505b (as soon as they are received). The messages a:IM3-a:IM5 (from the sender Usa) and the message b:IM6-b:IM8 (from the sender Usb) displayed in the window 505b represent two distinct conversations with the sender Usa and with the send Usb, respectively (which are generally discriminated by prefixing each message a:IM3- a:IM5, b:IM6-b:IM8 with a nickname of the corresponding sender Usa and Usb—i.e., a: and b:, respectively, in the example at issue); the messages a:IM3-a:IM5 and b:IM6-b:IM8 may be interleaved among them (according to when they have been received by the receiver Usb, in turn depending on when they have been submitted and then sent by the senders Usa and Usb).

Figure 5:
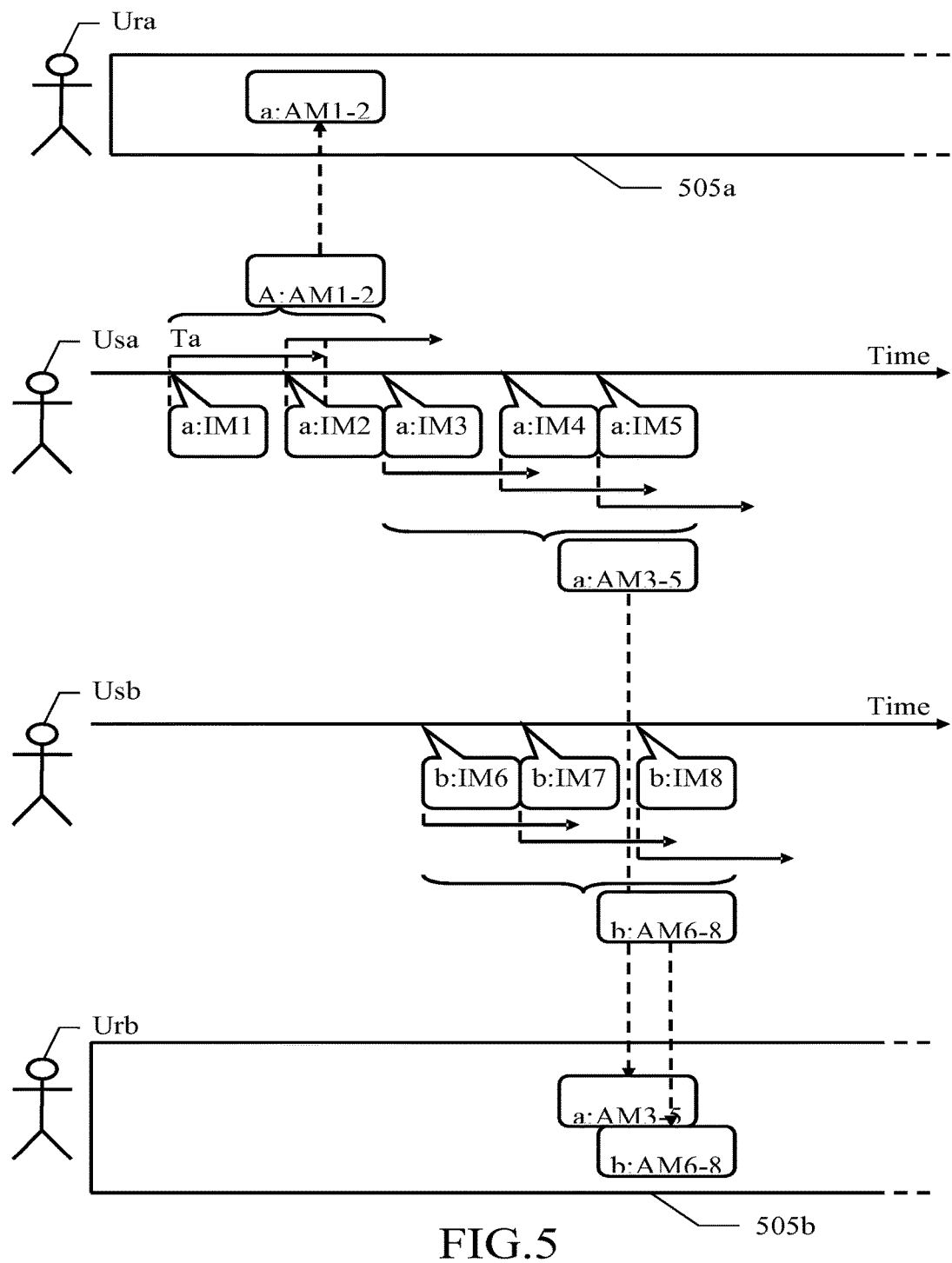
FIG. 5 shows an exemplary multi-thread session of an instant-messaging application according to an embodiment of the invention.

An exemplary multi-thread session of an instant-messaging application according to an embodiment of the invention is instead shown in the FIG. 5.

In this case as well, the original messages submitted by the senders Usa and Usb are aggregated into aggregated messages; the aggregation is performed independently for each corresponding receiver Ura,Urb. For example, considering the same original messages a:IM1-a:IM5 as above for the sender Usa, the original messages a:IM1-a:IM2 are aggregated into an aggregated message a:AM1-2 for the receiver Ura, and the original messages a:IM3-a:IM5 are aggregated into an aggregated message a:AM3-5 for the receiver Usb (independently of the time distance between the original messages a:IM2 and a:IM3, since to be sent to different receivers Ura and Urb, respectively); likewise, considering the same original messages b:IM6-a:IM8 as above for the sender Usb, they are aggregated into an aggregated message b:AM6-8 for the receiver Usb.

The aggregated messages a:AM1-2, a:AM3-5, b:AM6-8 are sent to the corresponding receivers Ura,Urb as soon as they are completed, and they are displayed in succession within their windows 505a,505b as soon as they are received (again discriminated by prefixing each one of them with the nickname of the corresponding sender Usa,Usb).

As may be seen, the interleaving of the aggregated messages a:AM3-5, b:AM6-8 from the different senders Usa,Usb in the same window 505b is generally reduced. This significantly facilitates the understanding of the different conversations, and especially the extraction of the meaning of the different concepts that are conveyed by each sender.

Figure 6:
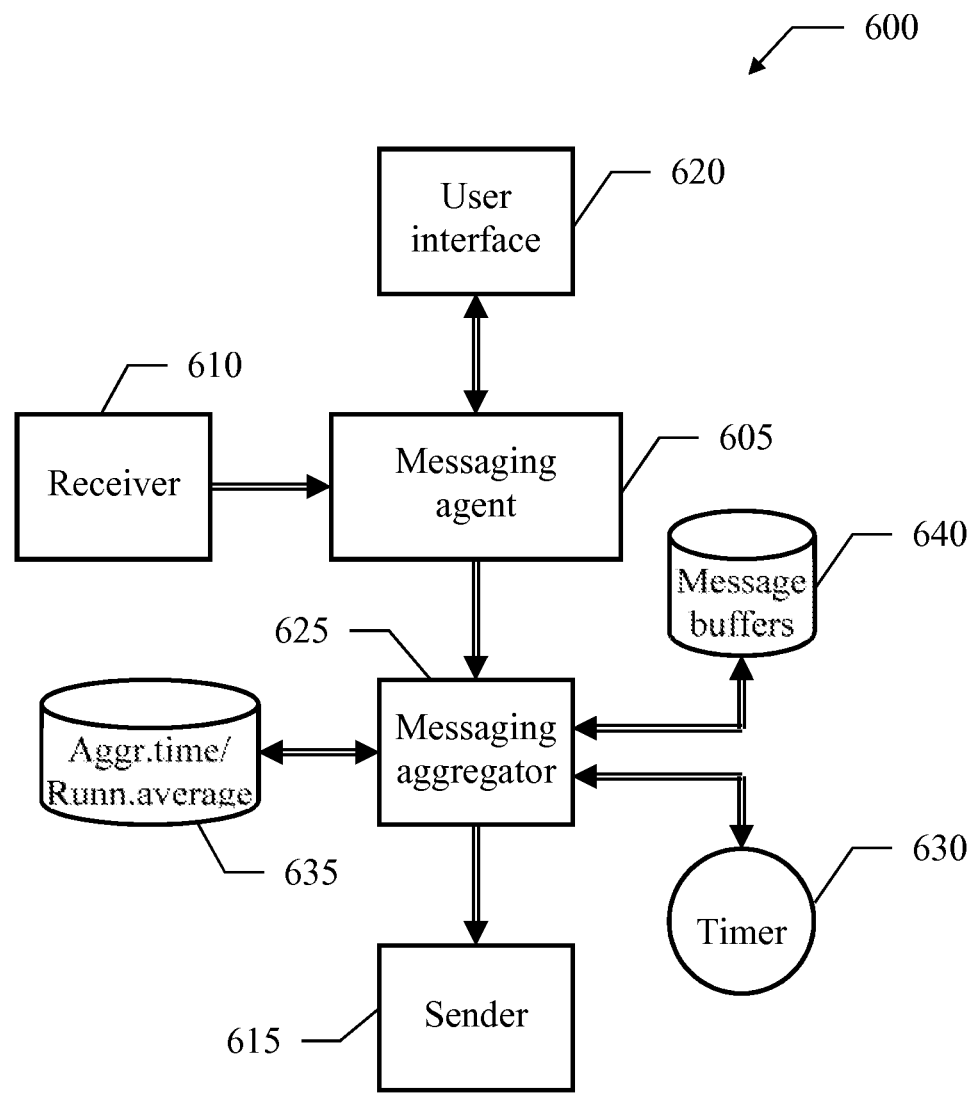
FIG. 6 shows the main software components that may be used to implement the solution according to an embodiment of the invention.

The main software components that may be used to implement the solution according to an embodiment of the invention are shown in the FIG. 6.

The information (programs and data) is typically stored in the hard disk and loaded (at least partially) into the working memory of a generic client when the programs are running, together with an operating system and other application programs (not shown in the figure). The programs are initially installed onto the hard disk, for example, from optical disks. In this respect, each component may represent a module, segment or portion of code, which comprises one or more executable instructions for implementing the specified logical function (or more).

Particularly, all the components are denoted as a whole with the reference 600. These components 600 comprise a messaging agent 605 (continuously running in the background) that implements a client side of the messaging service. The messaging agent 605 provides any (outbound) messages to be sent to the server offering the messaging service for its forwarding to other clients (not shown in the figure), and it is receive any (inbound) messages sent from the server that forwards it from the other clients. For this purpose, the messaging agent 605 exploits a receiver 610 that is listening for the inbound messages and a sender 615 that controls the sending of the outbound messages to the server according to a transmission protocol supported by the server, for example, the Internet Relay Chat (IRC); moreover, the messaging agent 605 interacts with a user interface 620, that is used to enter the outbound messages and to display the inbound and outbound messages in the corresponding conversations.

In the solution according to an embodiment of the invention, a messaging aggregator 625 bridges between the messaging agent 605 and the sender 615. The messaging aggregator 625 intercepts any outbound messages (i.e., the original messages) and aggregates them into the corresponding aggregated messages. For this purpose, the messaging aggregator 625 exploits a timer 630, which is used to measure the time distance between each pair of consecutive original messages. Moreover, the messaging aggregator 625 dynamically updates the aggregation time of each conversation according to a running average of the time distances among the corresponding original messages; the pair aggregation time/running average of each conversation is stored into a corresponding table 635. The messaging aggregator 625 controls a message buffer for each conversation, which is used to latch the original messages during the creation of the corresponding aggregated message; each message buffer is stored into a corresponding file 640 (for example, with a name based on the nickname of the other user involved in the conversation).

The above-described solution involves the sending of a lower number of (longer) aggregated messages over the network, with respect to the higher number of (shorter) original messages. Although the amount of information to be sent remains the same, its aggregation involves a remarkable reduction of traffic in the network over which the aggregated messages are sent (with respect to the original messages), and a reduction of the workload of the corresponding server. This improves the performance of the synchronous conferencing; moreover, this limits the risk of congestions of the network (with beneficial effects on any other computing machine connected thereto).

Figure 7:
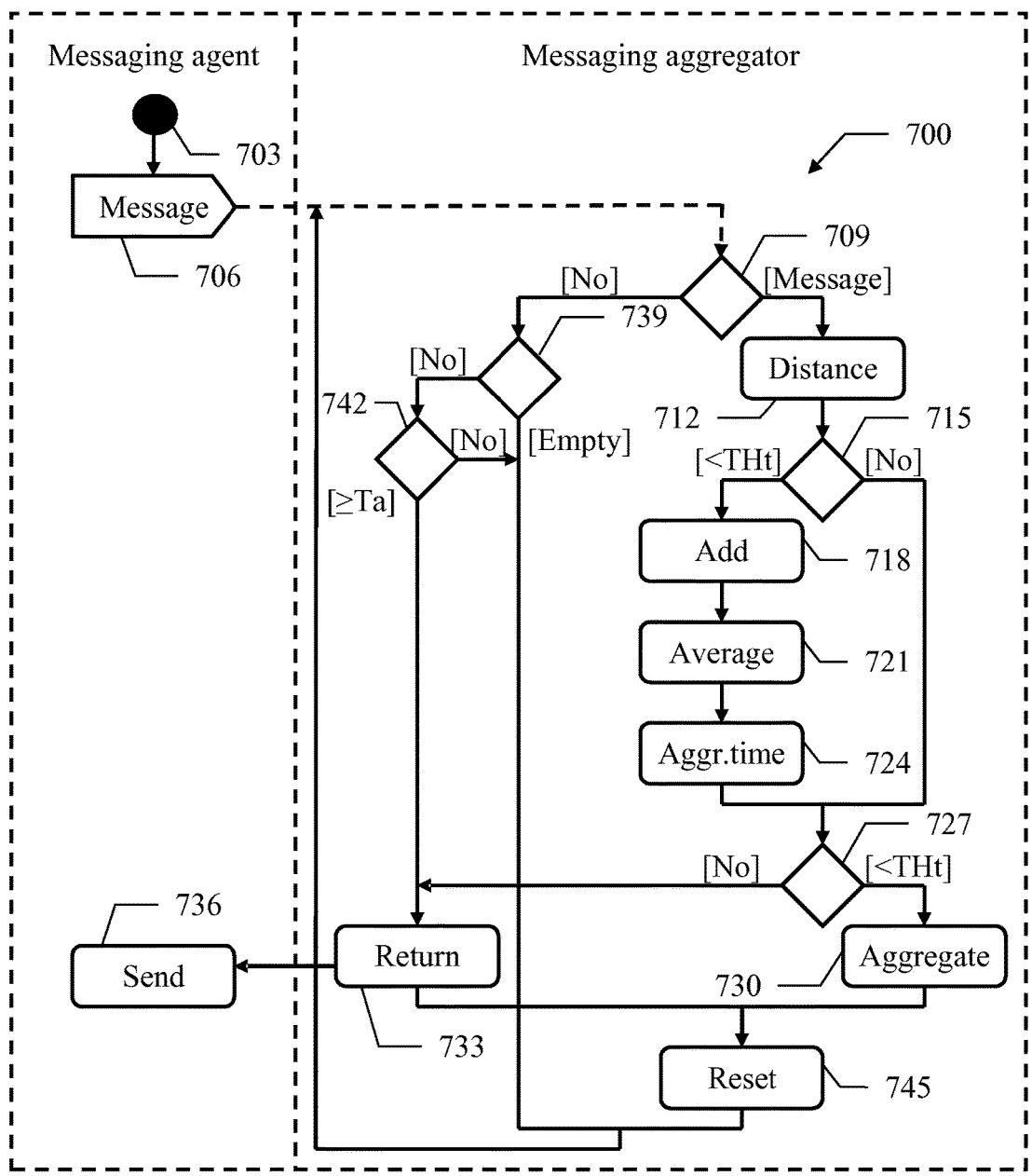
FIG. 7 shows an activity diagram describing the flow of activities relating to an implementation of the solution according to an embodiment of the invention.

An activity diagram describing the flow of activities relating to an implementation of the solution according to an embodiment of the invention is shown in the FIG. 7.

The diagram represents an exemplary process that may be used to send messages by the user (sender) of a generic client to other users (receivers) with a method 700. The method 700 begins at the black start circle 703 and then passes to block 706 in the swim-lane of the messaging agent as soon as a new original message (to be sent to a receiver, or more, in a corresponding conversation) is submitted; the submission of the new original message is intercepted by the messaging aggregator (for example, with hooking techniques).

The messaging aggregator implements a continuous loop in its swim-lane. Starting from the block 709, a test is made to verify whether a new original message has been submitted. If so, a new time distance TDn of the new original message from a preceding original message is set at block 712 to the content of the timer, which continuously counts the time upwards (initialized to zero at the beginning of the conversation, and reset to zero again at the submission of any new original message as described in the following).

The flow of activity branches at block 715 according to a comparison between the new time distance TDn and a corresponding threshold value THt (for example, equal to the aggregation time Ta). If the new time distance TDn is lower than this threshold value THt, at block 718 the new time distance TDn is added to a shift register that stores a pre-defined number (for example, N=5-10) of most recent significant time distances TDi, with i=1 . . . N (with the addition of the new time distance TDn that causes the shifting of the other time distances, with the lost of the oldest one when the shift register is full). A new value of the running average of the time distances (TDµ) is calculated at block 721 as the arithmetic mean of the time distances TDi stored in the shift register $$\left(\text{i.e., } TD\mu = \frac{\sum_{i=1}^{N} TDi}{N}\right).$$

The aggregation time Ta is updated at block 724, by setting it to a multiple of the running average TDµ according to a predefined factor F, for example, F=1.5-3, and preferably F=1.8-2.5, such as F=2 (i.e., Ta=F·TDµ). The flow of activity then descends into block 727; the same point is also reached directly from the block 715 when the new time distance TDn is equal to or higher than the threshold value THt.

In this way, the aggregation time Ta self-adapts dynamically to the behavior of the sender; particularly, the aggregation time Ta increases when the sender spends more time thinking between submitting consecutive original messages, whereas it reduces when this operation is faster.

Moreover, the updating of the aggregation time Ta is performed independently for each conversation. In this way, the aggregation time Ta may also self-adapt to the different contents of the conversations; for example, the aggregation time Ta increases when the conversation relates to a complex topic (for example, technical issues) requiring a longer thinking time for submitting the original messages, whereas it reduces when the conversation relates to a simple topic (for example, free-time arrangements) requiring a shorter thinking time for submitting the original messages.

In the above-described algorithm, the time distances having high values (i.e., higher than the threshold value THt) are discarded for the calculation of the running average TDµ, and then of the aggregation time Ta. In this way, the calculation is only based on the time distances that have significant values representative of an actual thinking time of the user between two consecutive original messages that are submitted in short succession (without taking into account longer time distances that may occur between original messages when the conversion is suspended).

With reference now to the block 727, a test is made to verify whether the addition of the new original message to the corresponding aggregated message would make its size higher than a further threshold value THs; for example, this threshold value THs may be set to a size limit of the messages in the transmission protocol that is used to implement the messaging service (for example, THs=100 k-1M bytes). If not, the new original message is added to the aggregated message in the message buffer at block 730. Conversely (meaning that the message buffer is practically full), the messaging aggregator at block 733 returns the aggregated message stored in the message buffer to the messaging agent (with the message buffer that is then flushed). In response thereto, the messaging agent at block 736 sends the aggregated message to the corresponding receiver as usual.

Referring back to the block 709 in the swim-lane of the messaging aggregator, if no new original message has been submitted the flow of activity continues to block 739. In this phase, a test is made to verify whether the message buffer is empty (i.e., no aggregated message is under construction). If not (meaning that an aggregated message is available), the flow of activity continues to block 742; in this phase, the content of the timer (counting the time distance from the previous original message) is compared with the aggregation time Ta. If the content of the timer is equal to or higher than the aggregation time Ta, the flow of activity continues to the block 733 as above (so as to cause the return of the aggregated message stored in the message buffer to the messaging agent, with the flushing of the message buffer, for its sending to the corresponding receiver).

The flow of activity merges again at block 745 from the block 730 or from the block 733. At this point, the timer is reset to zero, so as to start the counting of the time distance from the new original message. The flow activity then returns to the block 709 from the block 745, from the block 739 (when the message buffer is empty) or from the block 742 (when the content of the timer, i.e., the time distance from the previous original message, is lower than the aggregation time Ta), so as to reiterate the same operations continuously.

Naturally, in order to satisfy local and specific requirements, a person skilled in the art may apply to the solution described above many logical and/or physical modifications and alterations. More specifically, although this solution has been described with a certain degree of particularity with reference to one or more embodiments thereof, it should be understood that various omissions, substitutions and changes in the form and details as well as other embodiments are possible. Particularly, different embodiments of the invention may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the disclosed solution may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variable involved), and the term a/an should be intended as one or more items (unless expressly indicated otherwise).

For example, an embodiment provides a method for operating a synchronous conference on a computing system. The method comprises the following steps. At least one sequence of original messages to be sent from a sender user to a corresponding at least one receiver user is provided. The original messages of each sequence are aggregated into corresponding aggregated messages according to a time distance between each pair of consecutive original messages of the sequence. The aggregated messages are sent to the corresponding at least one receiver user.

However, the same solution may be applied to any synchronous conference (see below); the synchronous conference may be based on any type of messages (for example, comprising text, images, video), which messages may be sent to either one or many other users. The original messages may be aggregated in any way (see below). Moreover, the aggregated messages may be sent to the corresponding receiver users in any way (for example, with any transmission protocol such as PSYC, SILC, XMPP and MUD).

In an embodiment, the step of aggregating the original messages comprises adding each original message to a current aggregated message; the current aggregated message is sent to said at least one receiver user when no further original message is provided within an aggregation time.

However, the aggregation time may be defined in any way (see below); in any case, the original messages may be aggregated in other ways (for example, according to more sophisticated analyses of their time pattern).

In an embodiment, the method further comprises the step of updating the aggregation time according to a measure of the corresponding time distances.

However, the aggregation time may be updated in any way (see below), either individually for each sequence of original messages or globally for the sender user; in any case, a simplified implementation wherein the aggregation time is static (for example, set to a pre-defined value that may be customized by the sender user) is not excluded.

In an embodiment, the step of updating the aggregation time includes calculating a running average of at least part of the time distances, and updating the aggregation time according to the running average.

However, the measure of the time distances may be calculated and the aggregation time may be updated accordingly in any way (see below).

In an embodiment, the step of calculating a running average includes calculating the running average of at least part of the time distances lower than a threshold value.

However, the threshold value may be set in any way (see below), and the time distances may be filtered in any way (for example, according to their age); in any way, the possibility of having no filtering of the time distances is contemplated (for example, when the measure of the time distances is based on a statistical parameter that automatically discard their outliers, such as the median).

In an embodiment, the threshold value is based on the aggregation time.

However, the threshold value may be set to any value based on the aggregation time (for example, a fraction thereof); in any case, the threshold value may also be set independently of the aggregation time (for example, to a pre-defined value).

In an embodiment, the step of calculating the running average includes setting the running average to the mean of the time distances lower than the threshold value of a pre-defined number of most recent pairs of consecutive original messages.

However, the running average may be calculated from any number of time distances (up to all of them), and according to any statistical parameter thereof (for example, their geometrical mean, median, mode and the like).

In an embodiment, the step of updating the aggregation time includes setting the aggregation time to a multiple of the measure of the time distances.

However, the aggregation time may be set to any multiple of the measure of the time distances, or more generally in any other way based thereon (for example, by updating a current value of the aggregation time by a delta derived from this measure).

In an embodiment, the method further comprises the step of sending each aggregated message to the corresponding at least one receiver user when a size of the aggregated message reaches a further threshold value.

However, the further threshold value may be defined in any way (for example, as a maximum number of original messages that may be aggregated); in any case, this verification may also be omitted at all.

In an embodiment, the step of providing at least one sequence of original messages includes providing a plurality of overlapped sequences of original messages.

However, the same solution may be applied to any number of sequences of original messages, down to a single one.

In an embodiment, the synchronous conference is an instant-messaging session.

However, the same solution may be applied to whatever synchronous conference in the broadest meaning of the term (for example, online chats, electronic meetings, web conferences, multi-player games, and the like).

In an embodiment, the steps of the method are executed on a client computing system of the sender user.

However, the same steps may also be performed on any other computing system (for example, a proxy, a server or even the client of the receiver user), even if the more distant the implementation from the client computing system the lower the reduction of the network traffic.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program comprising code means for causing a computing system to perform the steps of the above-described method when the computer program is executed on the computing system.

A further embodiment provides a computer program product comprising a non-transitory computer readable medium embodying a computer program, the computer program comprising code means directly loadable into a working memory of a computing system thereby configuring the computing system to perform the same method.

However, the above-described solution may be implemented as a stand-alone module, as a plug-in for the application managing the synchronous conference (for example, the messaging agent), or even directly in itself; alternatively, it is also possible to deploy the same solution as a service that is accessed through a network (such as in the Internet).

Thus, as described herein, the present invention provides one or more embodiments based on aggregating messages. Particularly, one or more aspects of specific embodiments of the invention are set out in the independent claims and advantageous features of the same solution are set out in the dependent claims, with the wording of all the claims that is herein incorporated verbatim by reference (with any advantageous feature provided with reference to a specific aspect of the solution according to an embodiment of the invention that applies mutatis mutandis to every other aspect thereof).

More specifically, an aspect provides a method for operating a synchronous conference on a computing system, wherein original messages are aggregated into corresponding aggregated messages according to a time distance between each pair of consecutive original messages.

A further aspect provides a corresponding computer program.

A further aspect provides a corresponding computer program product.

A further aspect provides a corresponding system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Another embodiment provides a computing system comprising means configured for performing the steps of the above-described method.

However, the same solution may also be carried out on a system based on a different architecture (for example, a local, wide area, global, cellular or satellite network), and exploiting any type of (wired and/or wireless) connections. However, its implementation on a stand-alone computer is not excluded (for example, a server hosting virtual machines of the users). In any case, each computer may have another structure or may comprise similar elements (such as cache memories temporarily storing the programs or parts thereof); moreover, it is possible to replace the computer with any computing or data processing or code execution entity, either based on a physical machine or a virtual machine, or with a combination of multiple entities (such as a multi-tier architecture, a grid computing infrastructure, and the like).

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

What is claimed is:

1. A method for operating a synchronous conference on a computing system, the method comprising:
   providing, by one or more processors, at least one sequence of original messages to be sent from a sender user to a corresponding at least one receiver user via a network;
   aggregating, by one or more processors, the original messages of each sequence into corresponding aggregated messages according to a time distance between each pair of consecutive original messages of said each sequence, wherein consecutive original messages that are within a predefined temporal proximity are aggregated as a pair;
   adding, by one or more processors, each original message from the original messages to a current aggregated message, the current aggregated message being sent to said corresponding at least one receiver user in response to no further original message being provided within an aggregation time;
updating, by one or more processors, the aggregation time according to a measure of corresponding time distances;
calculating, by one or more processors, a running average of at least part of the corresponding time distances, and
updating, by one or more processors, the aggregation time according to the running average; and
sending, by one or more processors, aggregated messages to the corresponding at least one receiver user via the network, wherein the aggregated messages are exchanged in a synchronous conference between the sender user and the corresponding at least one receiver user, wherein the original messages are aggregated into the aggregated messages before being exchanged between the sender user and the corresponding at least one receiver user.

2. The method according to claim 1, wherein said calculating the running average comprises:
calculating, by one or more processors, the running average of at least part of the corresponding time distances lower than a threshold value.

3. The method according to claim 2, wherein the threshold value is based on the aggregation time.

4. The method according to claim 2, wherein said calculating the running average comprises:
setting the running average to a mean of the corresponding time distances lower than a threshold value of a pre-defined number of most recent pairs of consecutive original messages.

5. The method according to claim 1, wherein said updating the aggregation time comprises:
setting the aggregation time to a multiple of the measure of the corresponding time distances.

6. The method according to claim 1, further comprising:
sending, by one or more processors, each of the aggregated messages to the corresponding at least one receiver user in response to a size of said each of the aggregated messages reaching a further threshold value.

7. The method according to claim 1, wherein said providing at least one sequence of original messages comprises:
providing a plurality of overlapped sequences of original messages.

8. The method according to claim 1, wherein the synchronous conference is an instant-messaging session.

9. The method of claim 1, further comprising:
dynamically varying, by one or more processors, the predefined temporal proximity based on an amount of time that was historically taken by the sender user between submitting each of the original messages.

10. The method of claim 9, wherein the original messages are related to a same topic.

* * * * *